(12) United States Patent
Niwa

(10) Patent No.: US 7,802,135 B2
(45) Date of Patent: Sep. 21, 2010

(54) ROLLBACK METHOD AND INFORMATION PROCESSING APPARATUS EXECUTING THE SAME

(75) Inventor: Akimasa Niwa, Kiyosu (JP)

(73) Assignee: DENSO CORPORATION, Kariya (JP)

( * ) Notice: Subject to any disclaimer, the term of this patent is extended or adjusted under 35 U.S.C. 154(b) by 357 days.

(21) Appl. No.: 12/081,321

(22) Filed: Apr. 15, 2008

(65) Prior Publication Data
US 2008/0270831 A1    Oct. 30, 2008

(30) Foreign Application Priority Data
Apr. 24, 2007    (JP) .............................. 2007-114447

(51) Int. Cl.
*G06F 11/00*    (2006.01)
(52) U.S. Cl. ...................................... 714/15
(58) Field of Classification Search .................. 714/15, 714/20
See application file for complete search history.

(56) References Cited

U.S. PATENT DOCUMENTS

| | | | | |
|---|---|---|---|---|
| 5,414,840 | A  * | 5/1995  | Rengarajan et al. ................. | 1/1 |
| 5,485,608 | A  * | 1/1996  | Lomet et al. ......................... | 1/1 |
| 6,088,773 | A  * | 7/2000  | Kano et al. ................... | 711/161 |
| 6,148,416 | A  * | 11/2000 | Masubuchi ................... | 714/15 |
| 6,185,577 | B1 * | 2/2001  | Nainani et al. ...................... | 1/1 |
| 6,543,006 | B1 * | 4/2003  | Zundel et al. ................. | 714/19 |
| 6,567,928 | B1 * | 5/2003  | Lyle et al. ..................... | 714/15 |
| 6,961,865 | B1 * | 11/2005 | Ganesh et al. ................. | 714/2 |
| 7,055,057 | B2   | 5/2006  | Achiwa | |
| 7,363,537 | B1 * | 4/2008  | Svarcas et al. ................. | 714/15 |
| 7,519,628 | B1 * | 4/2009  | Leverett ............................. | 1/1 |
| 7,661,028 | B2 * | 2/2010  | Erofeev ....................... | 714/15 |
| 2005/0050387 | A1 | 3/2005  | Mariani et al. | |
| 2008/0162990 | A1 * | 7/2008  | Wang et al. ................... | 714/19 |
| 2008/0288819 | A1 * | 11/2008 | Heller, Jr. .................... | 714/19 |
| 2008/0313496 | A1 * | 12/2008 | Prabhakaran et al. ......... | 714/15 |
| 2009/0327807 | A1 * | 12/2009 | Varadarajan et al. .......... | 714/15 |

FOREIGN PATENT DOCUMENTS

| | | |
|---|---|---|
| JP | A-H02-257228 | 10/1990 |
| JP | A-H11-053239 | 2/1999 |
| JP | A-H11-345137 | 12/1999 |

OTHER PUBLICATIONS

Office Action mailed on Mar. 10, 2009 issued from the Japanese Patent Office in the corresponding Japanese patent application No. 2007-114447 (and English translation).

* cited by examiner

*Primary Examiner*—Bryce P Bonzo
(74) *Attorney, Agent, or Firm*—Posz Law Group, PLC

(57) ABSTRACT

It is determined that a write access is executed to a stack area of a main memory. It is then determined whether another write access to a corresponding access destination address in the stack area occurred in the past by referring to an access flag table. In contrast, it is determined that a write access is executed to a global area of the main memory. It is then determined whether another write access to a corresponding access destination address in the global area occurred in the past with referring to an access list. Such a configuration can efficiently provide individual advantages of the determination methods using both the access flag table and the address list. The presence or absence of the past saving execution can be efficiently determined at the time of write access.

17 Claims, 10 Drawing Sheets

FIG. 10A

ACCESS FLAG TABLE 16a

| TABLE INDEX | ACCESS FLAG |
|---|---|
| 800 | 0 |
| 801 | 0 |
| 802 | 1 |

ACCESS FLAG TABLE 16b

| TABLE INDEX | ACCESS FLAG ROW |
|---|---|
| 800 | 0011001000010000 |
| 801 | 0110001110101011 |
| 802 | 0000110011101100 |

︙

ROLLBACK METHOD AND INFORMATION PROCESSING APPARATUS EXECUTING THE SAME

CROSS REFERENCE TO RELATED APPLICATION

This application is based on and incorporates herein by reference Japanese Patent Application No. 2007-114447 filed on Apr. 24, 2007.

FIELD OF THE INVENTION

The present invention relates to a rollback method and a technology of continuing operation of a system at a failure in a microcomputer by re-writing saved data to a memory.

BACKGROUND OF THE INVENTION

In a conventional rollback process or method, data of a write access destination in a memory is normally saved at every writing or write access to the memory. At the rollback process, the saved data is re-written in the memory with LIFO (Last In First Out) manner. Multiple times of write accesses may be performed or overlapped with respect to a certain memory address. In such a case, data in the certain address are saved in multiple times and the saved data are re-written in the multiple times. Accordingly, such a rollback process causes a problem that transfer of data not essentially needing re-writing increases a time needed for restoring data.

To solve such a problem, some techniques are proposed for reducing the overlapped data in the saving memory. For example, in Patent Document 1, it is determined whether a database file is already outputted to a journal file in a block unit or partial unit of the block unit. Only when the database file is determined to be not outputted, the database file is outputted to the journal file. This configuration reduces overlapped saved data generated in the saving memory.

For instance, in Patent document 2, when an update process is executed to a certain data item in a database, it is checked whether there is any log information recording another update process previously executed to data of the certain data item. When the log information is already present, recording log information is stopped. Thus, generation of the overlapped or redundant saved data can be decreased.

Patent Document 1: JP-H2-257228 A

Patent document 2: JP-H1-53239 A

The technologies in Patent Document 1 and Patent document 2 mentioned above can surely reduce overlapped data in the saving memory or saving data. There is, however, no disclosure of a detailed determination method or whether data has been already saved. That is, the following is not specifically disclosed: how to save data and record it; how to make a determination as to whether data matches with the already saved data at subsequent data saving. If the method of the determination is complicated, the determination may require a time and cause a delay of the original process. Moreover, the determination may require a significant time when saving is executed with respect to a memory address unit. The effective speed of an application program executed on such a memory is significantly decreased compared with that of a system without considering nor including a rollback process.

SUMMARY OF THE INVENTION

The present invention is made in consideration of such a problem. It is an object to provide an efficient determination of presence or absence of previous data saving execution at the time of executing a write access, thereby decreasing generation of overlapped data in a saving memory.

According to an example of the present invention, a method is provided for executing a rollback process to restore a run state of a microcomputer to a past state. The method comprises: preparing an access flag table and an address list, the access flag table recording information indicating whether a write access previously occurred with respect to an access destination address of a main memory, the address list listing an address of the main memory, wherein data of the address was saved to a saving memory; referring to one of (i) the access flag table and (ii) the address list, prior to a write access to an access destination address of the main memory; making, with respect to the access destination address, an occurrence determination as to whether a write access previously occurred; saving prior-update data, which is data before updating, of the access destination address to the saving memory while updating the one of the access flag table and the address list referred to, when the occurrence determination is negated; and using the prior-update data saved to the saving memory when executing a rollback process.

According to such a rollback method, the access flag table or the address list is used appropriately. The characteristics of each determination method can be thus employed efficiently. Necessity of data saving process can be effectively determined.

According to another example of the present invention, an information processing apparatus executing the method mentioned above is provided.

According to yet another example of the present invention, an information processing apparatus is provided for executing a rollback process to restore a run state of a microcomputer to a past state. The apparatus comprises: a memory module configured to store an access flag table recording information indicating whether a write access previously occurred with respect to an access destination address of a main memory; a memory module configured to store an address list listing an address of the main memory, wherein data of the address was saved to a saving memory; a reference control unit configured to refer to one of (i) the access flag table and (ii) the address list, prior to a write access to an access destination address of the main memory; an occurrence determination control unit configured to make, with respect to the access destination address, an occurrence determination as to whether a write access previously occurred; a data saving control unit configured to save prior-update data, which is data before updating, of the access destination address to the saving memory while updating the one of the access flag table and the address list referred to, when the occurrence determination is negated; and a rollback control unit configured to use the prior-update data saved to the saving memory when executing a rollback process.

BRIEF DESCRIPTION OF THE DRAWINGS

The above and other objects, features, and advantages of the present invention will become more apparent from the following detailed description made with reference to the accompanying drawings. In the drawings:

FIGS. 10A, 10B are diagrams for explaining examples of an access flag table;

DETAILED DESCRIPTION OF THE PREFERRED EMBODIMENTS

An embodiment according to the present invention will be explained with reference to drawings. In addition, the embodiment of the present invention can be modified in various manners within a technical scope of the present invention without being limited to the following embodiment.

[Explanation of Configuration]

Figure 1:
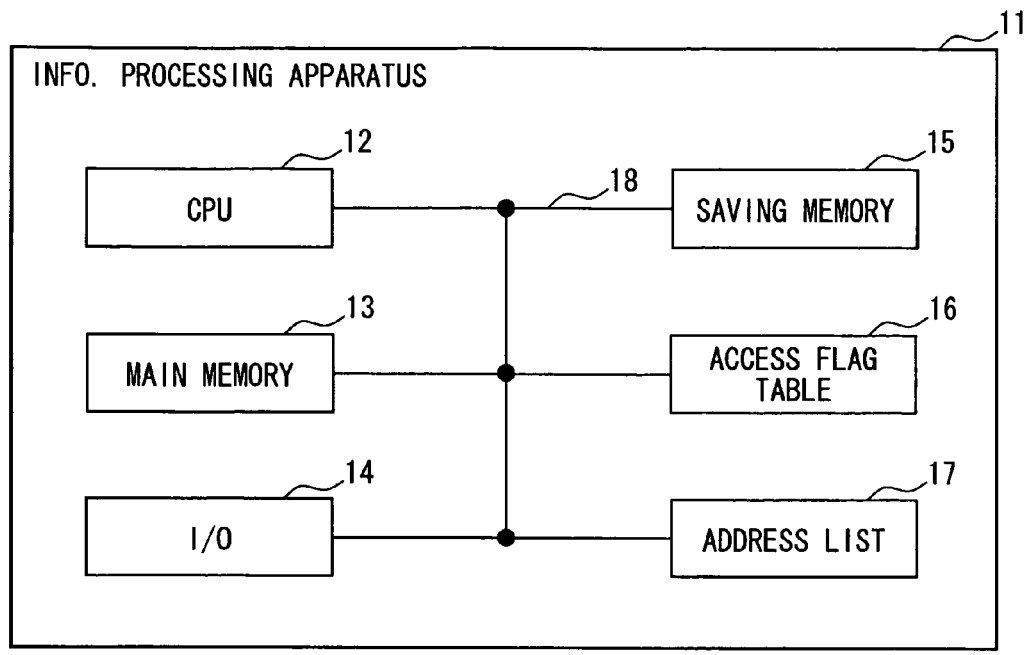
FIG. 1 is a block diagram illustrating a configuration of an information processing apparatus according to an embodiment of the present invention.

FIG. 1 is a block diagram illustrating an overall configuration of an information processing apparatus 11 which can realize a rollback process or method of the present embodiment. The information processing apparatus 11 includes a CPU 12, a main memory 13, an I/O 14, a saving memory 15, an access flag table 16, an address list 17, and a bus 18 connecting the foregoing components.

The CPU 12 functions as a control unit and is a well-known microcomputer and can execute various kinds of processes based on preset programs. The CPU 12 can access each component through the bus 18.

The main memory 13 is a memory module composed of a DRAM etc., and can develop program codes, data, etc. The I/O 14 manages communication with apparatuses outside of the information processing apparatus 11. The outside apparatuses include a display apparatus, an audio output apparatus, and an operation apparatus, for instance.

The saving memory 15 is a memory module, which is composed of a DRAM etc., and independent as a body different from the main memory 13 in the present embodiment. The saving memory 15 is used for storing or saving data to be required in a rollback process. In addition, the saving memory 15 may be included in a partial area of the main memory 13, instead of being provided as the independent body different from the memory module of the main memory 13.

The access flag table 16 is included in a memory module composed of a DRAM or the like; it is a table for storing or recording information required in a rollback process. Alternatively, the access flag table 16 may be included in a partial area of the main memory 13. The details of the access flag table 16 are mentioned later.

The address list 17 is included in a memory module composed of a DRAM or the like; it is a list for storing or recording information required in a rollback process. Alternatively, the address list 17 may be included in a partial area of the main memory 13. The details of the address list 17 are mentioned later.

[Explanation of Operation]

Basic Embodiment

The following explains a process executed by the CPU 12 in a basic embodiment. Herein, only a process relevant to the present embodiment is explained from among the processes executed by the CPU 12. The explanation is omitted about processes of application programs etc. executed by the CPU 12.

(1) Write Access Process

Figure 2:
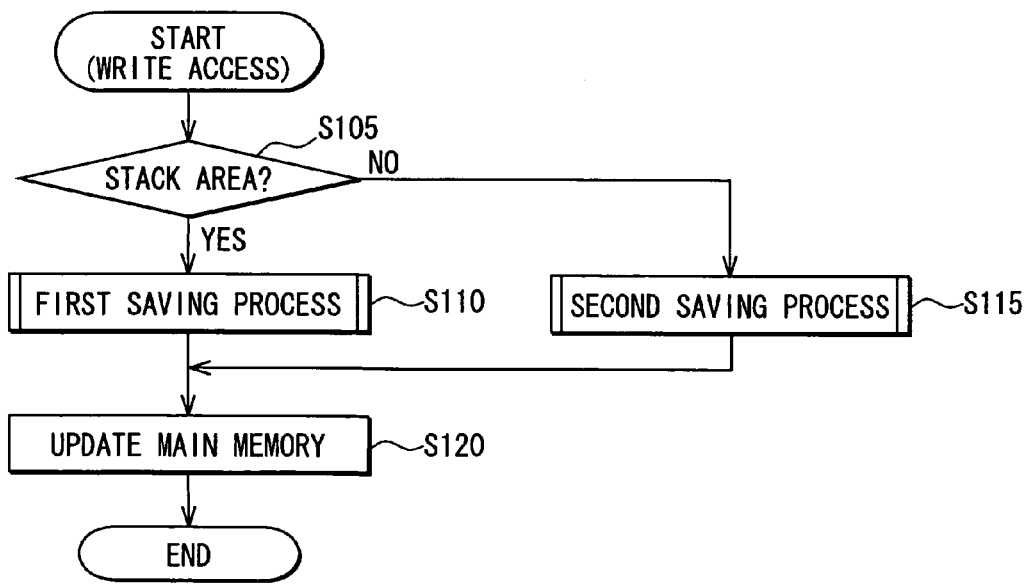
FIG. 2 is a flow chart for explaining a write access process.

First, a write access process executed by the CPU 12 is explained using a flow chart of FIG. 2. The write access process is started when a write access (write-in instruction) to the main memory 13 is made by an application program.

With the start of the process, the CPU 12 determines whether an access destination is included in a stack area of the main memory 13 at S105. The stack area is defined as an area for allocating a local variable within a program executed by the CPU 12.

When the determination at S105 is affirmed or when it is determined that the access destination is included in a stack area of the main memory 13, the processing proceeds to S110. When it is determined that the access destination is not included in a stack area, corresponding to NO at S105, the processing proceeds to S115. Herein, that the access destination is not included in a stack area signifies that the access destination is included in a global area, for instance. The global area is used for allocating a global variable within a program executed by the CPU 12, for instance.

A first saving process is executed at S110. The details of the first saving process are mentioned later. After ending the first saving process, the processing proceeds to S120. A second saving process is executed at S115. The details of the second saving process are mentioned later. After ending the second saving process, the processing proceeds to S120.

The main memory 13 is updated at S120. For instance, a specified data item is written in an address specified by the application program. The main memory 13 is updated and the present write access process then ends.

(2) First Saving Process

Figure 3:
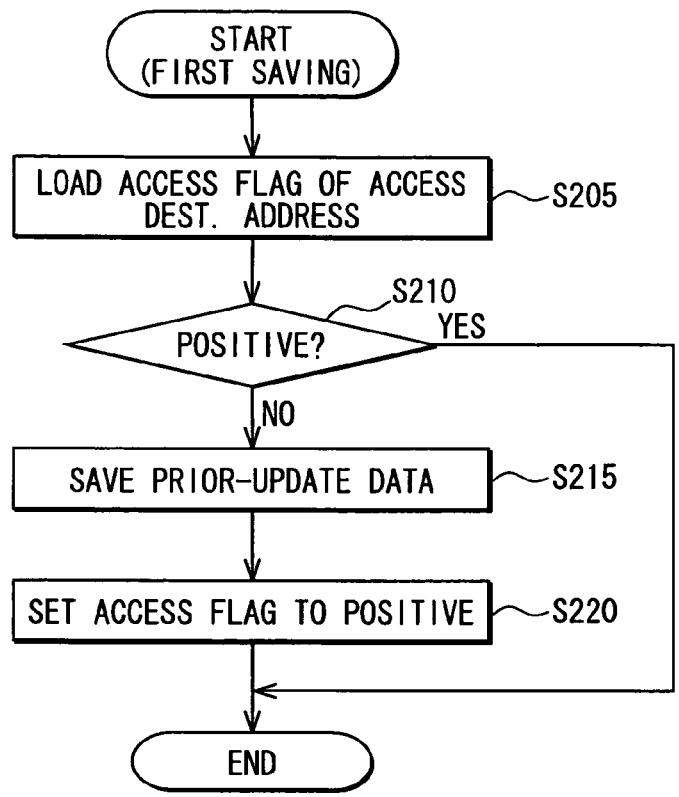
FIG. 3 is a flow chart for explaining a first saving process.

Next, a first saving process executed by the CPU 12 is explained using a flow chart of FIG. 3. The first saving process starts by being called at S110 of the write access process mentioned above.

With the start of the process, the CPU 12 loads an access flag corresponding to an access destination address from the access flag table 16 at S205. The example is mentioned later.

Then, it is determined whether the loaded access flag is positive or negative at S210. The access flag being positive is indicated by a flag value being in "1" state to signify that the corresponding access destination address was a target of a write access in the past. The access flag being negative is indicated by a flag value being in "0" state to signify that the corresponding access destination address has not been a target of a write access so far.

When the loaded access flag is determined to be positive, corresponding to YES at S210, the present first saving process ends. The CPU 12 executes the processing following S110 of the write access process of the source having called the first saving process.

When the loaded access flag is determined to be not positive at S210, or when the loaded access flag is negative, corresponding to NO at S210, the processing proceeds to S215.

At S215, prior-update data, which is data before updating and is presently stored in the access destination address of the main memory 13, is saved in the saving memory 15. At the same time, a saving memory stack pointer of the saving memory 15 is decremented, i.e., the pointer is moved such that a point indicated by the pointer is decremented by a single address. At subsequent S220, the access flag of the access destination address is set to being positive, and stored or recorded in the access flag table 16. The present first saving process ends. The CPU 12 then executes the processing following S110 of the write access process of the source having called the first saving process.

Figure 4:
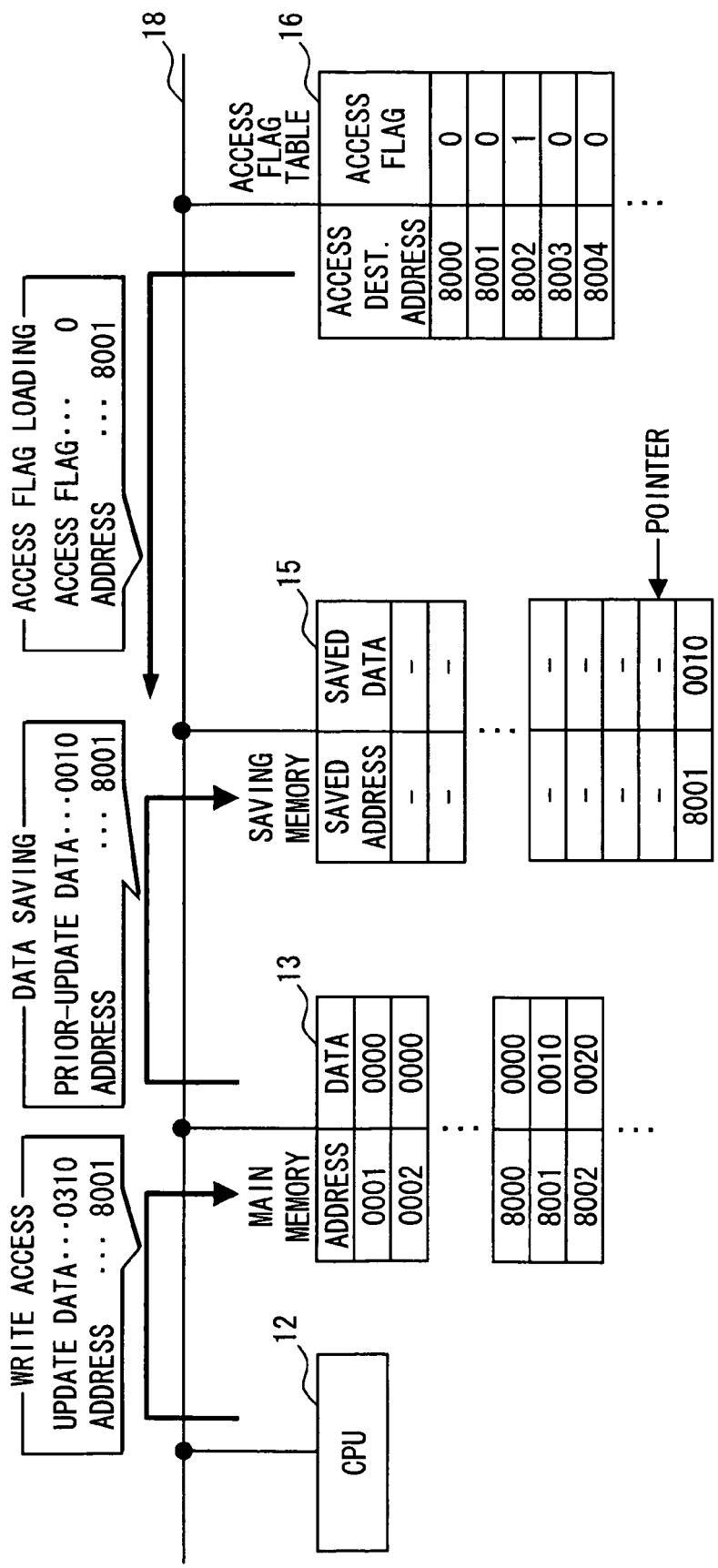
FIG. 4 is a data flow diagram for explaining an example of the first saving process.

Herein, an operation of the first saving process is explained using a diagram of FIG. 4. When writing data "0310" in an address "8001" of the main memory 13, the CPU12 reads out an access flag "0" of the address "8001" from the access flag table 16.

The CPU 12 refers to the access flag "0" to thereby determine that data present in the address "8001" of the main memory 13 needs to be saved or evacuated and executes the saving process. For instance, the CPU 12 reads the data "0010" from the address "8001" of the main memory 13. The address "8001" and data "0010" are written or saved in a point in the saving memory 15 indicated by the saving memory stack pointer. The saving memory stack pointer is decremented, i.e., a point indicated by the pointer is moved as being decremented by a single address.

Then, the CPU 12 writes data "0310" as update data in the address "8001" of the main memory 13 as updating. Herein, when the CPU 12 refers to the access flag "1," the update data is written in the corresponding address of the main memory 13, without saving the present data or prior-update data.

(3) Second Saving Process

Figure 5:
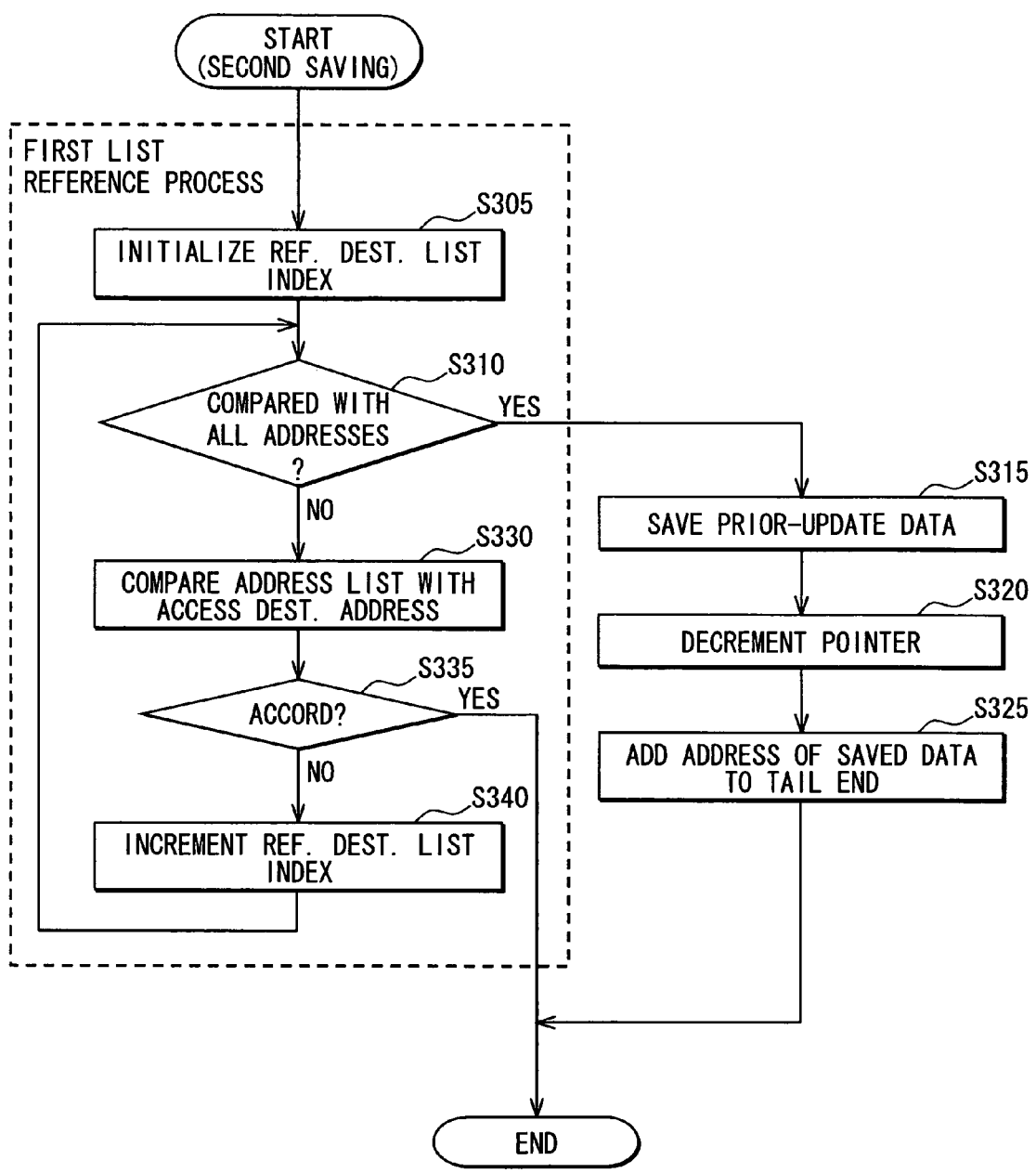
FIG. 5 is a flow chart for explaining a second saving process.

Next, a second saving process executed by the CPU 12 is explained using a flow chart of FIG. 5. The second saving process starts by being called at S120 of the write access process mentioned above.

With the start of the process, the CPU 12 initializes a reference destination list index at S305. This reference destination list index is a pointer which indicates a reference destination of the address list 17. The list element, which this reference destination list index points to, becomes a target for the reference.

At S310, it is determined whether all the addresses in the address list 17 were compared with the write access destination address. Herein, "compared" means a comparison executed at S330 mentioned later. When it is determined that all the addresses in the address list 17 were compared with the write access destination address, corresponding to YES at S310, the processing proceeds to S315. When it is determined that all the addresses in the address list 17 were not compared with the write access destination address, corresponding to NO at S310, the processing proceeds to S330.

At S315 after YES at S310, prior-update data, which is data before updating and is presently stored in the access destination address of the main memory 13, is saved in the saving memory 15. The stack pointer of the saving memory 15 is moved as being decremented at S320. The tail end of the address list 17 is changed into the address corresponding to the saved data, and the address "FFFF" meaning the tail end is added as a new list element at S325. The present second saving process ends. The CPU 12 then executes the processing following S120 of the write access process of the source having called the second saving process.

At S330 after NO at S310, the access destination address is compared with a list element (address) in the address list 17 indicated by the reference destination list index. The processing is branched by a result of the comparison at S335. When the addresses accord with each other, corresponding to YES at S335, the present second saving process ends. The CPU 12 then executes the processing following S120 of the write access process of the source having called the second saving process. In contrast, the addresses do not accord with each other, corresponding to NO at S335, the processing proceeds to S340.

Figure 6:
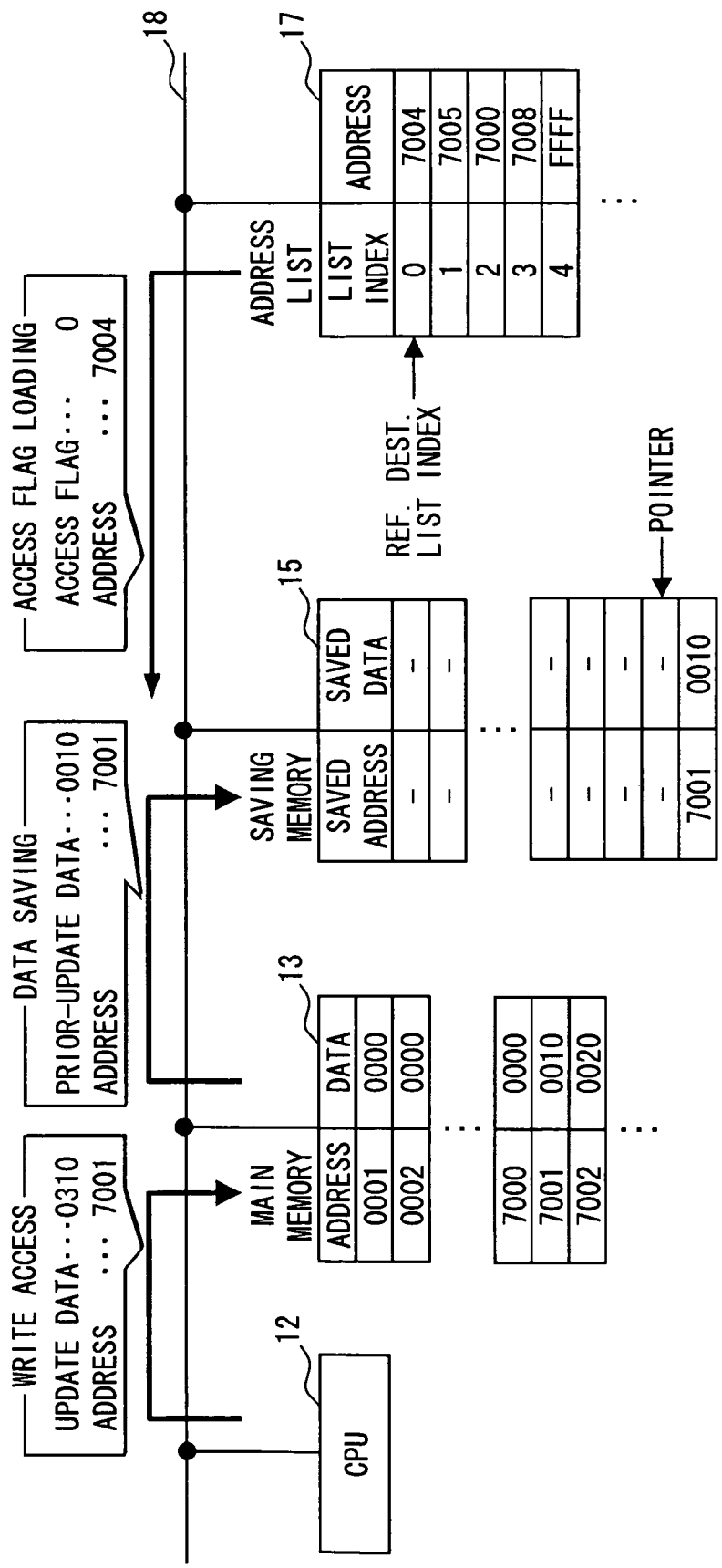
FIG. 6 is a data flow diagram for explaining an example of the second saving process.

At S340 after NO at S335, the reference destination list index is incremented, and the processing returns to S310 mentioned above. Herein, an operation of the second saving process is explained using a diagram of FIG. 6. The CPU 12 intends to write data "0310" in the address "7001" of the main memory 13. First, the address is read from the address list 17 while incrementing from "0" in the list index. It is determined whether the address "7001" of the write destination is present in the address list 17. It may be determined that the intended address is not present in the address list 17 even after the reference destination list index circulates or goes around the address list. In such a case, the CPU 12 determines that the present (prior-update) data in the address "7001" of the main memory 13 needs to be saved, thereby saving the present data in the saving memory 15. For instance, the CPU 12 reads the data "0010" from the address "7001" of the main memory 13. The address "7001" and data "0010" are written or saved in a point in the saving memory 15 pointed by the saving memory stack pointer. Then, the CPU 12 writes data "0310" as update data in the address "7001" of the main memory 13. The CPU 12 changes the address in the address list 17 corresponding to the list index "4" from "FFFF" to "7001," and newly adds an address "FFFF" as a list index "5."

It may be determined that the intended address is present in the address list 17 before the reference destination list index has gone around or circulated the address list 17. In such a case, the CPU 12 writes data "0310" as update data in the address "7001" of the main memory 13 without saving the present prior-update data.

(4) Roll Back Process

Figure 7:
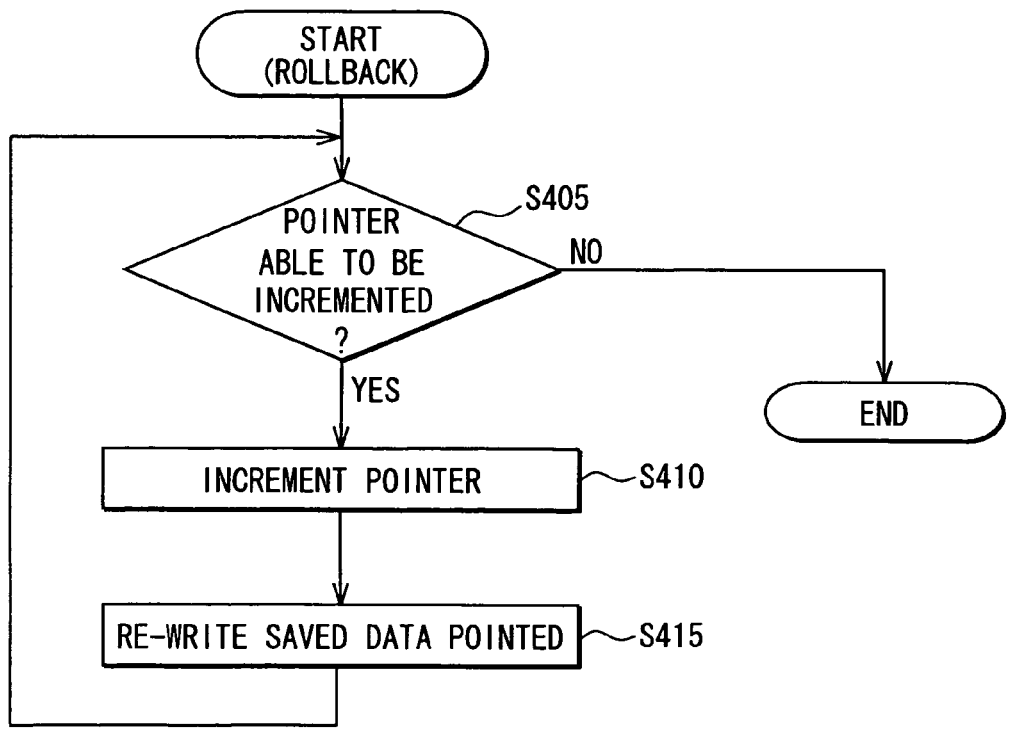
FIG. 7 is a flow chart for explaining a rollback process.

Next, a rollback process executed by the CPU 12 is explained using a flow chart of FIG. 7. Execution of a roll back process is started when a certain failure occurs in the information processing apparatus 11, or when an instruction of the execution of the rollback process is received through the I/O 14 from another apparatus connected to the information processing apparatus 11.

With the start of execution of a roll back process, the CPU 12 determines whether the stack pointer of the saving memory 15 can be incremented, i.e., a point indicated by the stack pointer of the saving memory 15 can be incremented. When it is determined that the pointer can be incremented, corresponding to YES at S405, the processing proceeds to S410. When it is determined that the pointer cannot be incremented, corresponding to NO at S405, the present roll back process ends.

At S410 after YES at S405, the stack pointer of the saving memory 15 is incremented, or is moved such that the corresponding point indicated by the pointer is incremented. The data in the saving memory 15 to which the stack pointer points is returned and re-written to the corresponding address of the main memory 13 at S415. The corresponding address is equivalent to the address in the saving memory 15 to which the stack pointer points. After completing returning and re-writing the data, the processing returns to S405 mentioned above.

Thus, the data contents of the main memory 13 can be returned to the previous static point or state by executing the roll back process.

Effect of Basic Embodiment

In the information processing apparatus 11 of the present embodiment, when a write access to a stack area of the main memory 13 is executed, corresponding to YES at S105, it is determined whether another write access occurred in the access destination address in the past by referring to the access flag table 16 at S110. When a write access to a global area is executed, corresponding to NO at S105, it is determined whether another write access occurred in the access destination address in the past by referring to the address list 17 at S115.

Such a configuration can efficiently provide individual advantages of the determination methods using both the access flag table 16 and the address list 17. The presence or absence of the past saving execution can be efficiently determined at the time of write access.

Herein, the access flag table 16 records or stores an access flag indicating whether a write access occurred in the past for each address of the access destination. The CPU 12 loads the access flag corresponding to the access destination address from the access flag table 16, and makes an occurrence determination as to whether another write access occurred in the corresponding address in the past from the access flag. Only when there was no write access in the past, the present prior-update data of the access destination address is saved or evacuated to the saving memory 15. At the same time, the access flag of the access flag table 16 corresponding to the access destination address is updated. Therefore, the occurrence determination using the access flag table 16 is suitable for accesses to the stack area. The stack memory occupies a small ratio of the memory area and the locality of accesses is high.

Accordingly, the size of the table necessary for determining whether data saving process is required can be decreased by using the access flag table. Further, one time of referring to the access flag table by designating an address allows the determination as to whether data saving process is required with respect to a corresponding access destination address.

Moreover, the address list 17 lists, in order of saving time points, addresses of the main memory 13 corresponding to the data saved to the saving memory 15 in the past. The CPU 12 determines sequentially in order from the leading end or top of the address list 17 whether a list element of the list accords with the access destination address. The determination (hereinafter, also called an accordance determination) is once ended when a list element of the list accords with the access destination address. When all the list elements do not accord with the access destination address, the CPU 12 saves prior-update data, which is data before updating, of the access destination address to the saving memory 15 and adds the access destination address to the address list 17. Therefore, the accordance determination using the address list 17 is suitable for accesses to the global area. The global area or usage area of the global area occupies a great ratio of the memory area; further, the locality of accesses is low and sequentiality and periodicity of accesses are high.

Accordingly, adoption of a list form matches with a characteristic of accesses and enables the determination as to whether data saving process is required only with relatively less number of times of references.

(Modifications)

Next, the modifications are described. Herein, the following mainly explains differences from the basic embodiment mentioned above.

(1) Third Saving Process

A third saving process can be substituted for the first saving process mentioned above. Next, the third saving process executed by the CPU 12 is explained using a flow chart of FIG. 8. Further, in the third saving process, an access flag table 16*a* shown in FIG. 10A is used instead of the access flag table 16 used by the first saving process. Details will be mentioned later.

With the start of the third saving process, the CPU 12 designates a table index from an access destination address at S505. The table index is used for designating a record of the access flag table 16*a*. The table index is represented by the top 12 bits of the access destination address having 16 bits in the present embodiment. Therefore, sixteen access destination addresses correspond to one table index. In addition, a table illustrating the relation between access destination addresses and table indexes may be prepared separately, and be referred to.

Then, the access flag corresponding to the table index is loaded from the access flag table 16*a* at S510. Herein, the access flag table 16*a* is explained using FIG. 10A.

Each of records included in the access flag table 16*a* includes (i) a table index for designating each record and (ii) an access flag for indicating whether a write access occurred in the past in an access destination address group. For instance, a table index "800" corresponds to an access flag "0" as shown in FIG. 10A. The table index "800" corresponds to an access destination address group "8000" to "800F." Therefore, after designating a table index from the access destination address, the CPU 12 loads an access flag corresponding to the designated table index from the access flag table 16*a*. Thus, it is understood whether a write access occurred in the past in any one of the addresses included in the corresponding access destination address group.

Figure 8:
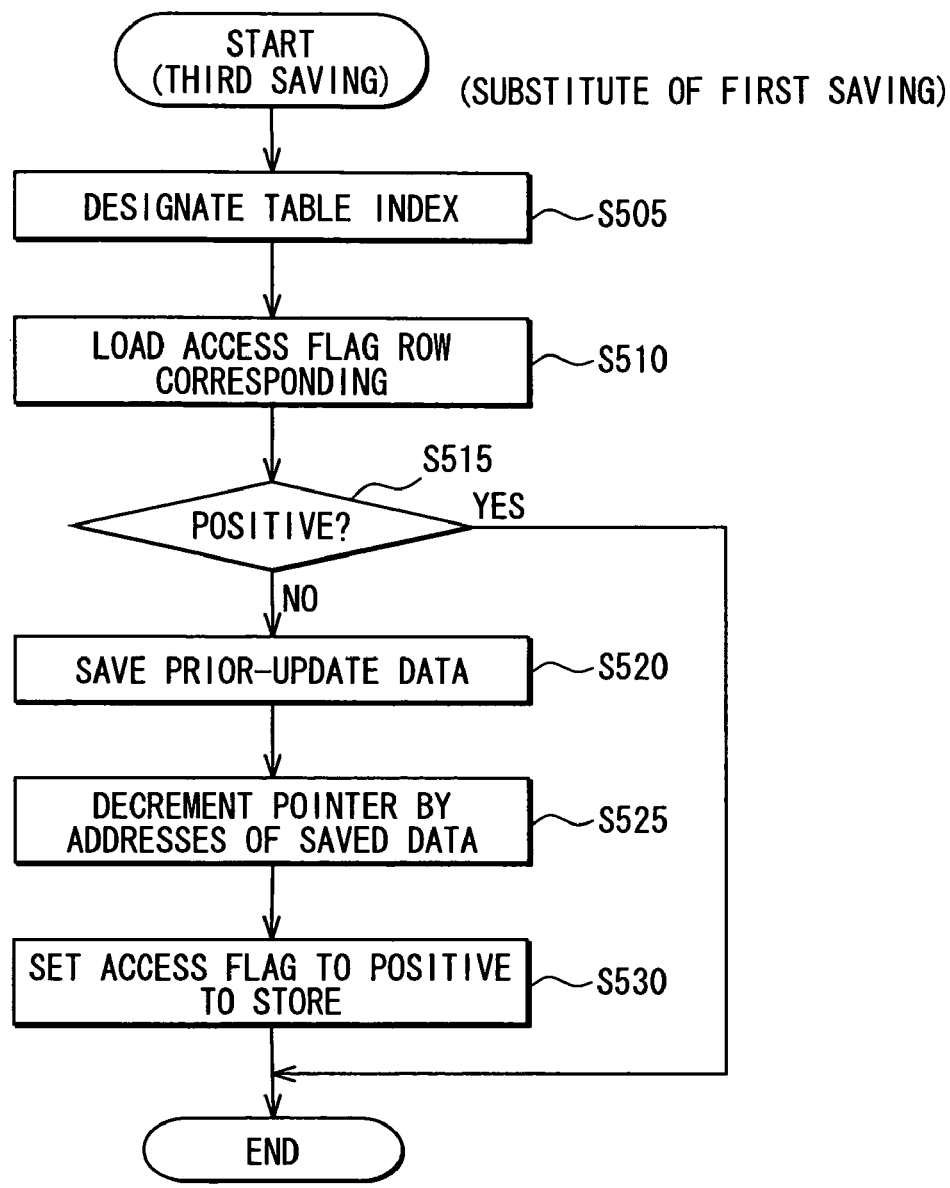
FIG. 8 is a flow chart for explaining a third saving process.

At 515 in FIG. 8, it is then determined whether the loaded access flag is positive or negative. The access flag being positive is indicated by a flag value being in "1" state to signify that the corresponding access destination address group was a target of a write access in the past. The access flag being negative is indicated by a flag value being in "0" state to signify that the corresponding access destination address group has not been a target of a write access so far.

When the loaded access flag is determined to be positive, corresponding to YES at S515, the present third saving process ends. The CPU 12 then executes the processing following S110 of the write access process of the source having called the present third saving process.

In contrast, when the loaded access flag is determined to be not positive at S515, or when the loaded access flag is negative, corresponding to NO at S515, the processing proceeds to S520.

At S520, prior-update data, which is data before updating and is presently stored in the address group corresponding to the access destination address of the main memory 13, is saved in the saving memory 15. "The address group corresponding to the access destination address" indicates all the addresses associated with the same table index as the table index designated at S505.

At S525 thereafter, a saving memory stack pointer of the saving memory 15 is decremented, i.e., is moved such that the point indicated by the pointer is decremented by the number of addresses, data of which were saved. At subsequent S530, the access flag of the access destination address group is set to being positive, and recorded or stored in the access flag table 16*a*. The present third saving process ends. The CPU 12 then executes the processing following S110 of the write access process of the source having called the present third saving process.

If the third saving process is executed instead of the first saving process, the table size of the access flag table 16 can be constructed as being smaller.

(2) Fourth Saving Process

A fourth saving process can be substituted for the first saving process mentioned above. Next, the fourth saving process executed by the CPU 12 is explained using a flow chart of FIG. 9. Further, in the fourth saving process, an access flag table 16b shown in FIG. 10B is used instead of the access flag table 16 used by the first saving process. Details will be mentioned later.

With the start of the fourth saving process, the CPU 12 designates a table index from an access destination address at S605. The table index is used for designating a record of the access flag table 16b. The table index is represented by the top 12 bits of the access destination address having 16 bits in the present embodiment. Therefore, sixteen access destination addresses corresponds to one table index. In addition, a table illustrating the relation between access destination addresses and table indexes may be prepared separately, and be referred to.

Then, it is determined whether an access flag row corresponding to the table index designated at S605 has been already loaded in the CPU 12 at S610. The access flag row is a set of sixteen access flags, and each flag is allocated to one bit.

That is, one access flag row consists of one word of 16 bits.

When it is determined that the access flag row has been already loaded, corresponding to YES at S610, the processing proceeds to S630. When it is determined that the access flag row corresponding to the table index designated at S605 has not been loaded, corresponding to NO at S610, the processing proceeds to S615.

At S615 after NO at S610, other access flag row(s) having been already loaded is stored in the access flag table 16b. Then, the access flag row corresponding to the table index designated at S605 is loaded from the access flag table 16b at S620. Herein, the access flag table 16b is explained using FIG. 10B.

Each of records included in the access flag table 16b includes (i) a table index for designating each record and (ii) an access flag row for indicating whether a write access occurred in the past in the access destination address group. The access flag row includes flags individually having one-to-one correspondence to the addresses included in the access destination address group. The order of the addresses accords with that of the flags. For example, the access destination address group "8000" to "800F" correspond to the table index "800." In the access flag row having "0011001000010000," the uppermost flag corresponds to the address "800F," while the lowermost flag corresponds to the address "8000." Therefore, after designating a table index from the access destination address, the CPU 12 loads an access flag row corresponding to the designated table index from the access flag table 16b. Furthermore, if an access flag corresponding to the access destination address is selected from the access flag row, it is understood whether a write access occurred in the past in the corresponding access destination address.

Figure 9:
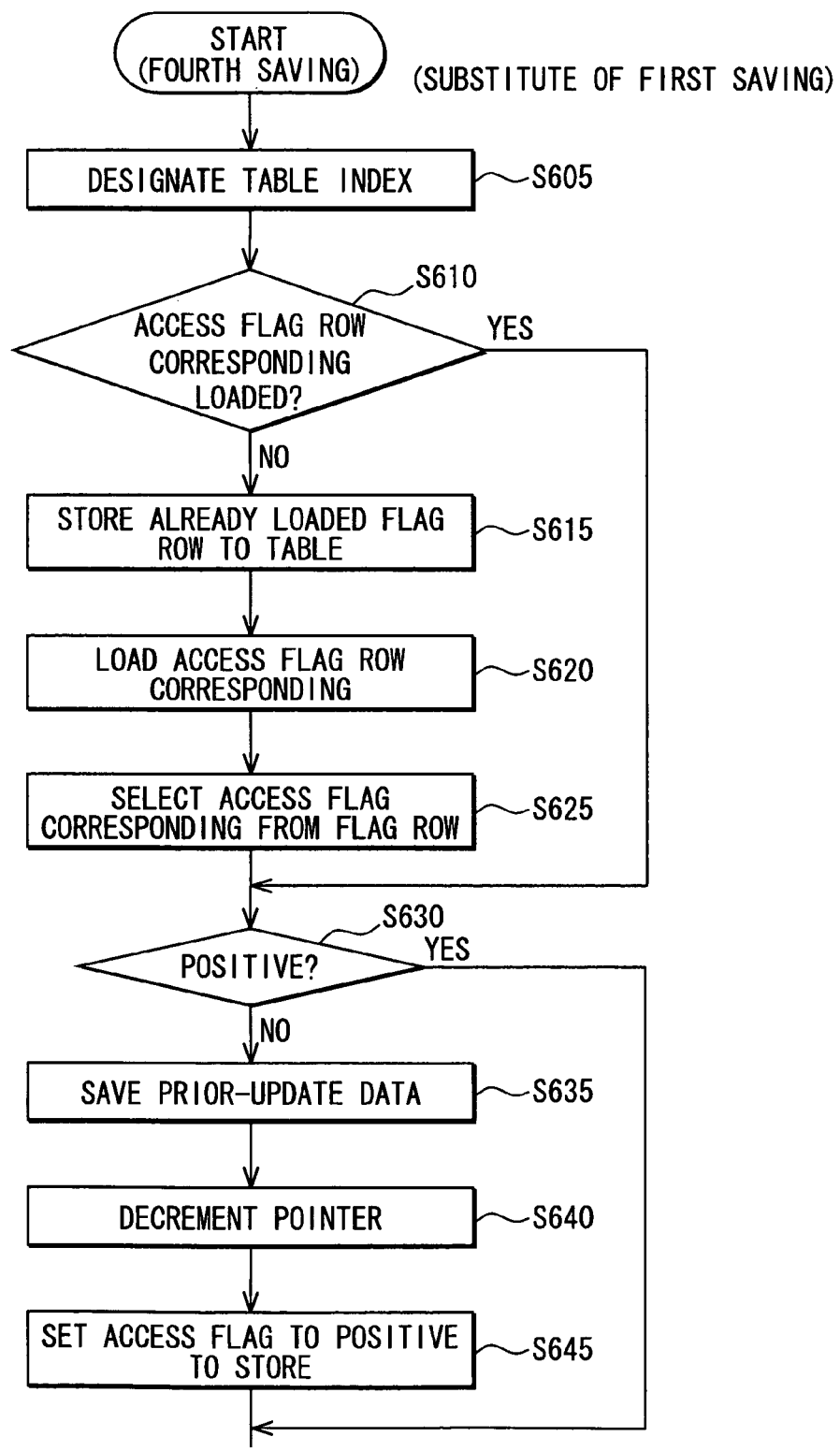
FIG. 9 is a flow chart for explaining a fourth saving process.

At S625 in FIG. 9, the access flag row is loaded and an access flag corresponding to the access destination address is selected from the loaded access flag row. The processing proceeds to S630.

At S630, it is determined whether the access flag is positive. When the access flag is determined to be positive, corresponding to YES at S630, the present fourth saving process ends. When it is determined that the access flag is not positive, corresponding to NO at S630, the processing proceeds to S635.

At S635 after NO at S630, prior-update data, which is before updating and presently stored in the access destination address, is evacuated or saved in the saving memory 15. At S640, the saving memory stack pointer of the saving memory 15 is decremented, i.e., is moved such that a point indicated by the pointer is decremented by a single address.

At subsequent S645, the access flag of the access destination address is set to being positive, and recorded or stored in the access flag table 16b. The present fourth saving process ends.

If the fourth saving process is executed instead of the first saving process, accesses to the access flag table 16b at the time of write accesses occurring can be reduced. In addition, when the CPU 12 executes a program having a high locality and high continuity of write accesses to the main memory 13, the accesses or times of the accesses to the access flag table 16b can be reduced.

(3) Second List Reference Process

Figure 11:
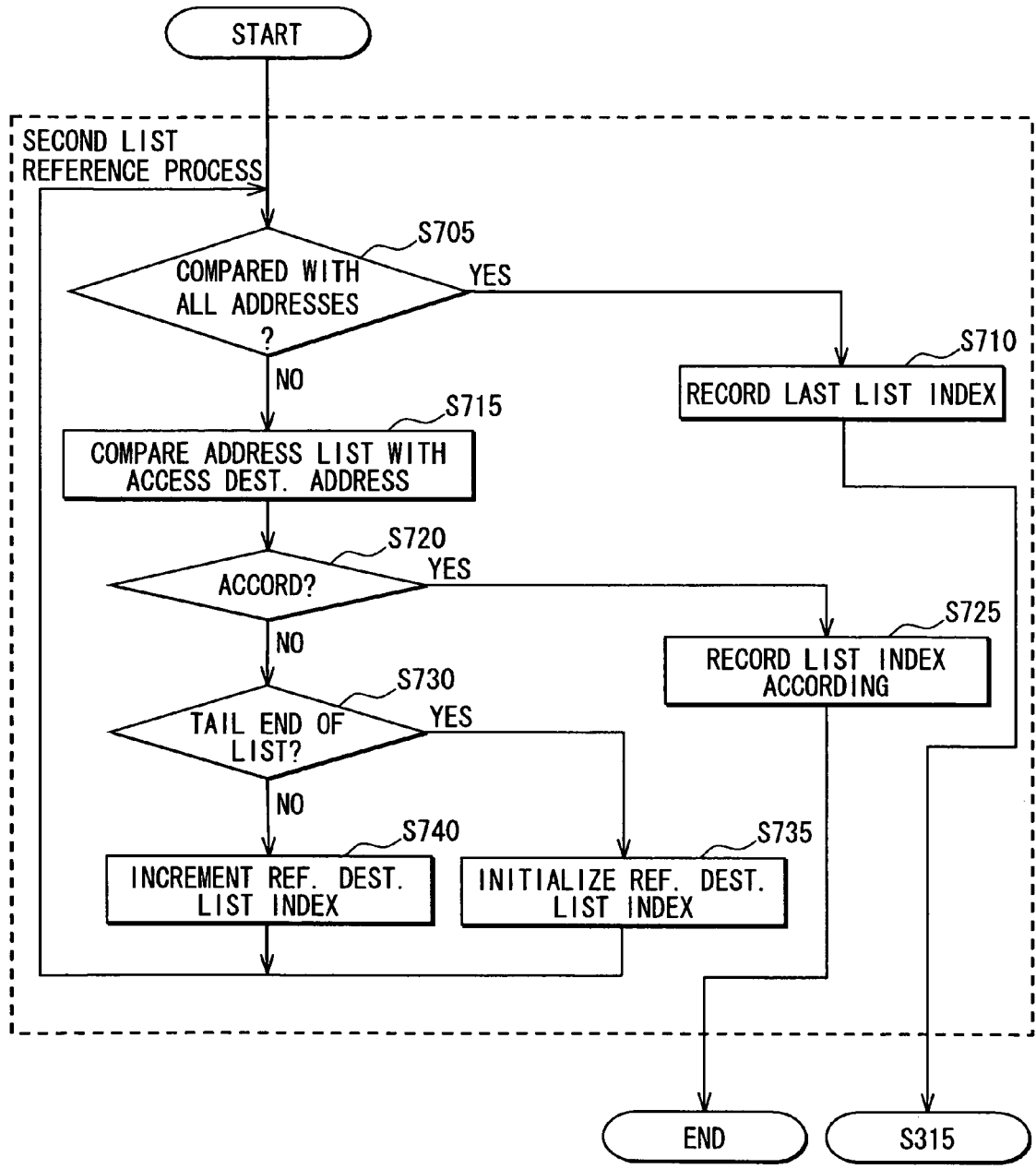
FIG. 11 is a flow chart for explaining a second list referencing process.

A second list reference process can be substituted for a first list reference process. Refer to FIG. 5, the first list reference process means S305, S310, S330, S335, and S340 of the second saving process. Next, the second list reference process executed by the CPU 12 is explained using a flow chart of FIG. 11.

With the start of the second list reference process, the CPU 12 determines whether all the addresses in the address list 17 were compared with the access destination address at S705. Herein, "compared" means a comparison executed at S715 mentioned later. When it is determined that all the addresses in the address list 17 were compared, corresponding to YES at S705, the processing proceeds to S710. When it is determined that all the addresses in the address list 17 were not compared, corresponding to NO at S705, the processing proceeds to S715.

At S710 after YES at S705, the list index of the address in the address list 17, which is compared at the last, is recorded or stored as a list index referred to at first when executing the next second list reference process. The second list reference process ends and the processing proceeds to S315 of the second saving process.

At S715 after NO at S705, an address of the address list is compared with the access destination address. It is determined whether the addresses accord with each other at S720. When it is determined that the addresses accord with each other, corresponding to YES at S720, the processing proceeds to S725. When it is determined that the addresses do not accord with each other, corresponding to NO at S720, the processing proceeds to S730.

At S725 after YES at S725, the list index of the corresponding address in the address list 17, which corresponds to that when the addresses accord, is recorded or stored as a list index referred to at first when executing the next second list reference process. The present second list reference process ends, and the second saving process is finished (refer to FIG. 5).

At S730 after NO at S720, it is determined whether the list index is at the tail end of the list. When it is determined that the list index is at the tail end of the list, corresponding to YES at S730, the processing proceeds to S735. When it is determined that the list index is not at the tail end of the list, corresponding to NO at S730, the processing proceeds to S740.

At S735 after YES at S730, the reference destination list index is initialized. That is, the list index of the leading end or top in the address list 17 is referred to. The processing returns to S705.

At S740 after NO at S730, the reference destination list index is decremented. The processing returns to S705. If the second list reference process is executed instead of the first list reference process, the average number of times of references with respect to the address list 17 can be reduced.

In addition, the accordance determination of addresses is started from the next of the stored list index. When the stored list index is at the tail end of the address list, the determination can be started from the leading end of the address list. The average number of times of references with respect to the address list 17 can be more reduced.

(4) Fifth Saving Process

Figure 12:
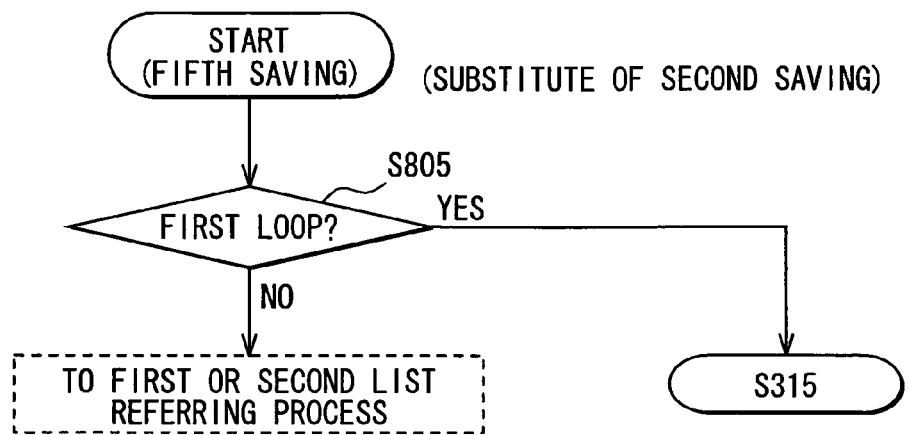
FIG. 12 is a flow chart for explaining a fifth saving process.

A fifth saving process can be substituted for the second saving process mentioned above. Next, the fifth saving process executed by the CPU 12 is explained using a flow chart of FIG. 12.

The CPU 12 determines whether (i) an execution trigger signal of the fifth saving process is a loop process in an application program and, further, (ii) the present fifth saving process is executed in the first or initial loop process at S805. When it is determined affirmatively at S805, the same process as S315 in FIG. 5 of the second saving process is executed and the CPU 12 executes thereafter the same processing as the second saving process (refer to FIG. 5).

In contrast, when it is determined negatively at S805, the first list reference process or the second list reference process of the second saving process mentioned above is executed (refer to FIG. 5 and FIG. 11).

That is, the fifth saving process executes S805 to precede the second saving process. According to a determination result at S805, the second saving process starts from a specific step. In addition, when executing a loop process which repeats the same processing, the CPU 12 or a microcomputer needs to perform a saving process for data of the main memory 13 in the first loop of the loop process with a high possibility. In the fifth saving process of the present embodiment, data is saved without referring to the address list 17 with respect to the first loop of the loop process. Thus, the load of referring to the address list 17 can be decreased. A speed of an executive operation of the application program by the CPU 12 can be therefore improved.

(5) Sixth Saving Process

Figure 13:
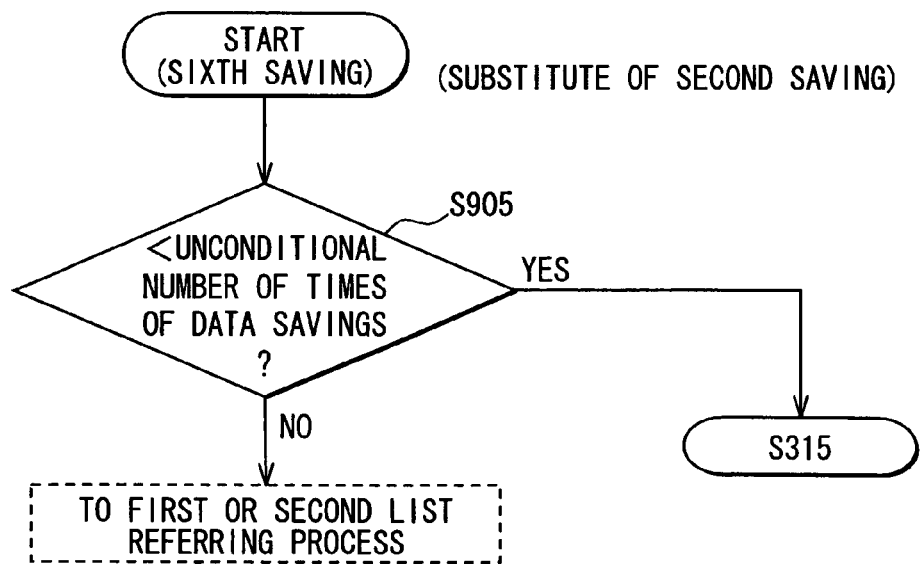
FIG. 13 is a flow chart for explaining a sixth saving process.

A sixth saving process can be substituted for the second saving process mentioned above using a flow chart of FIG. 13.

The CPU 12 determines whether the number of times of data savings is less than the number of times of unconditional data savings at an execution of an application program triggering the execution of the sixth saving process at S905. "The number of times of data savings" means the number of times of executions at S315 in FIG. 5. In addition, "the number of times of unconditional data savings" means a predetermined value, which is preferably several times.

When it is determined that the number of times of data savings is less than the number of times of unconditional data savings at S905, the same process as S315 of the second saving process is executed and the CPU 12 executes thereafter the same processing as the second saving process (refer to FIG. 5).

In contrast, when it is determined negatively at S905, the first list reference process or the second list reference process of the second saving process mentioned above is executed (refer to FIG. 5 and FIG. 11).

That is, the sixth saving process executes S905 to precede the second saving process. According to a determination result at S905, the second saving process starts from a specific step. In addition, after starting an execution of an application program, the CPU 12 or a microcomputer needs to perform, with a high possibility, a saving process for data of the main memory until the number of times of data savings reaches a predetermined value. This is because a possibility of using a new memory area is high. In the sixth saving process of the present embodiment, data is saved without referring to the address list 17 until the number of times of data savings reaches the predetermined value. Thus, the load of referring to the address list 17 can be decreased. A speed of an executive operation of an application program by the CPU 12 can be therefore improved.

Each or any combination of processes, steps, or means explained in the above can be achieved as a software unit (e.g., subroutine) and/or a hardware unit (e.g., circuit or integrated circuit), including or not including a function of a related device; furthermore, the hardware unit can be constructed inside of a microcomputer.

Furthermore, the software unit or any combinations of multiple software units can be included in a software program, which can be contained in a computer-readable storage media or can be downloaded and installed in a computer via a communications network.

It will be obvious to those skilled in the art that various changes may be made in the above-described embodiments of the present invention. However, the scope of the present invention should be determined by the following claims.

What is claimed is:

1. A method for executing a rollback process to restore a run state of a microcomputer to a past state, the method comprising:

preparing an access flag table and an address list, the access flag table recording information indicating whether a write access previously occurred with respect to an access destination address of a main memory, the address list listing an address of the main memory, wherein data of the address was saved to a saving memory;

referring to one of (i) the access flag table and (ii) the address list, prior to a write access to an access destination address of the main memory;

making, with respect to the access destination address, an occurrence determination as to whether a write access previously occurred;

saving prior-update data, which is data before updating, of the access destination address to the saving memory while updating the one of the access flag table and the address list referred to, when the occurrence determination is negated; and using the prior-update data saved to the saving memory when executing a rollback process.

2. The method according to claim 1, wherein:

the access flag table records an access flag as the information indicating whether a write access previously occurred for every access destination address of the main memory;

when making the occurrence determination by referring to the access flag table, the access flag corresponding to the access destination address is loaded from the access flag table, and the occurrence determination with respect to the access destination address is made from the loaded access flag; and only when the occurrence determination is negated, the prior-update data of the access destination address is saved to the saving memory while the access flag of the access flag table corresponding to the access destination address is updated.

3. The method according to claim 1, wherein:

the access flag table recording an access flag as the information indicating whether a write access previously occurred with respect to an access destination address group of the main memory, the access destination address group including multiple addresses;

when making the occurrence determination by referring to the access flag table, the access flag of the access destination address group corresponding to the access destination address is loaded from the access flag table, and the occurrence determination with respect to the access destination address group is made from the access flag; and only when the occurrence determination is negated, the prior-update data of the access destination address group is saved to the saving memory while the access flag of the access flag table corresponding to the access destination address group is updated.

4. The method according to claim 1, wherein:

the access flag table recording a flag row allocated to one word including flags, each of the flags indicating with respect to every address whether a write access previously occurred;

when making the occurrence determination by referring to the access flag table, the flag row allocated to the one word is loaded once from the access flag table, an access flag corresponding to the access destination address is selected from the loaded access flag row, and the occurrence determination with respect to the access destination address is made from the selected access flag; and only when the occurrence determination is negated, the prior-update data of the access destination address is saved to the saving memory while the access flag of the access flag table corresponding to the access destination address is updated.

5. The method according to claim 4, wherein the flag row is configured to correspond to one of units of access destination address groups, the access destination address groups being serially ordered in the main memory.

6. The method according to claim 5, wherein the flag row includes the access flags having an order equal to an order of addresses included in the access destination address group.

7. The method according to claim 1, wherein:

the address list lists addresses of the main memory, wherein data of each of the addresses is saved to the saving memory, in an order of time points when the data were saved to the saving memory;

when making the occurrence determination by referring to the address list, an accordance determination as to whether a list element of the address list accords with the access destination address is made sequentially from a leading end of the order of time points;

when any list element of the address list does not accord with the access destination address, the prior-update data is saved to the saving memory while the access destination address is added to the address list; and when a list element accords with the access destination address, the accordance determination is ended.

8. The method according to claim 1, wherein:

the address list lists addresses of the main memory, wherein data of each of the addresses is saved to the saving memory, in an order of time points when the data were saved to the saving memory;

when making the occurrence determination by referring to the address list, an accordance determination as to whether a list element accords with the access destination address is made from a recorded list element sequentially so as to go around all list elements of the address list;

when a certain list element accords, the certain list element is recorded and the accordance determination is ended; and when any list element does not accord with the access destination address even after completing going around all the list elements of the address list, a determination terminated list element of the address list is recorded and the prior-update data of the access destination address is saved to the saving memory while the access destination address is added to the address list.

9. The method according to claim 8, wherein:

the accordance determination is started from a list element next to the recorded list element; and when the recorded list element is at a tail end of the address list, the accordance determination is started from a list element at a leading end of the address list.

10. The method according to claim 7, wherein when the microcomputer executes a loop process which repeats loops of same processing, with respect to a write access process at an initial loop of the repeated loops, without making the accordance determination by referring to the address list, the prior-update data of the access destination address is saved to the saving memory while the access destination address is added to the address list.

11. The method according to claim 7, wherein:

a number of times of unconditional data saving processes is prepared, the unconditional data saving process unconditionally saving prior-update data of the access destination address to the saving memory without making the accordance determination; and even when the microcomputer makes the accordance determination by referring to the address list after starting a specific process, the prior-update data is saved to the saving memory without making the accordance determination while the access destination address is added to the address list until a number of times of write accesses to the main memory reaches the number of times of unconditional data saving processes.

12. The method according to claim 1, wherein when a write access is executed to a stack area of the main memory, the stack area being used to allocate local variables within a program executed by the microcomputer, the occurrence determination is made by referring to the access flag table.

13. The method according to claim 1, wherein when a write access is executed to a global area of the main memory, the global area being used to allocate global variables within a program executed by the microcomputer, the occurrence determination is made by referring to the address list.

14. An information processing apparatus executing the method according to claim 1.

15. An information processing apparatus for executing a rollback process to restore a run state of a microcomputer to a past state, the apparatus comprising:

a memory module configured to store an access flag table recording information indicating whether a write access previously occurred with respect to an access destination address of a main memory;

a memory module configured to store an address list listing an address of the main memory, wherein data of the address was saved to a saving memory;

a reference control unit configured to refer to one of (i) the access flag table and (ii) the address list, prior to a write access to an access destination address of the main memory;

an occurrence determination control unit configured to make, with respect to the access destination address, an occurrence determination as to whether a write access previously occurred;

a data saving control unit configured to save prior-update data, which is data before updating, of the access destination address to the saving memory while updating the one of the access flag table and the address list referred to, when the occurrence determination is negated; and a rollback control unit configured to use the prior-update data saved to the saving memory when executing a rollback process.

16. The information processing apparatus according to claim 15, wherein when a write access is executed to a stack area of the main memory, the stack area being used to allocate local variables within a program executed by the microcomputer, the occurrence determination is made by referring to the access flag table.

17. The information processing apparatus according to claim 15, wherein when a write access is executed to a global area of the main memory, the global area being used to allocate global variables within a program executed by the microcomputer, the occurrence determination is made by referring to the address list.

* * * * *